US005642641A

United States Patent [19]
Maxfield, Jr. et al.

[11] Patent Number: 5,642,641
[45] Date of Patent: Jul. 1, 1997

[54] DOME SHAPED EXTRUDED LOCATION FEATURE TOOL FOR MAKING THE LOCATION FEATURE AND METHOD FOR LOCATING ADJOINING PLATES USING THE LOCATION FEATURE

[75] Inventors: David E. Maxfield, Jr., Webster; Daniel L. Coughlin, Jr., Elba, both of N.Y.

[73] Assignee: Xerox Corporation, Stamford, Conn.

[21] Appl. No.: 653,376

[22] Filed: May 21, 1996

Related U.S. Application Data

[63] Continuation of Ser. No. 235,997, May 2, 1994, abandoned.

[51] Int. Cl.⁶ .................................................. B21D 22/04
[52] U.S. Cl. ...................... 72/358; 72/379.2; 72/377; 72/412; 72/352; 29/464; 52/789.1; 403/14; 411/504
[58] Field of Search ............................... 72/412, 414, 352, 72/343, 358, 377, 379.2, 325, 327; 403/14, 13, 393; 52/789.1, 798.1; 29/464, 525, 509, 524.1; 411/501, 504, 502

[56] References Cited

U.S. PATENT DOCUMENTS

| | | | |
|---|---|---|---|
| 2,215,882 | 9/1940 | Maloney | 29/524.1 |
| 2,594,810 | 4/1952 | Schaub | 29/525 |
| 2,932,338 | 4/1960 | Franck | 72/317 |
| 3,276,112 | 10/1966 | Tantlinger | 72/414 |
| 3,377,700 | 4/1968 | Cooley | 29/509 |
| 3,387,481 | 6/1968 | Harvey et al. | 72/379 |
| 3,771,480 | 11/1973 | Johnson | 72/358 |
| 3,819,246 | 6/1974 | List | 312/257 SK |
| 4,174,559 | 11/1979 | Persik et al. | 29/509 |
| 4,342,214 | 8/1982 | Neuendorf | 72/404 |
| 4,530,033 | 7/1985 | Meggs | 361/415 |
| 4,534,379 | 8/1985 | Burge | 137/385 |
| 4,535,616 | 8/1985 | Eason | 72/317 |
| 4,606,112 | 8/1986 | Jenkins | 29/464 |
| 4,736,503 | 4/1988 | Stock et al. | 29/34 R |
| 4,915,658 | 4/1990 | Lopata et al. | 445/30 |
| 5,031,953 | 7/1991 | Miller | 296/97.9 |
| 5,273,385 | 12/1993 | Rose | 72/325 |

FOREIGN PATENT DOCUMENTS

| | | | |
|---|---|---|---|
| 0178180 | 4/1986 | European Pat. Off. . | |
| 0586221 | 3/1994 | European Pat. Off. . | |
| 361353 | 10/1922 | Germany | 29/509 |
| 74326 | 6/1981 | Japan | 72/358 |
| 218720 | 8/1989 | Japan | 72/352 |
| 142778 | 5/1994 | Japan | 72/352 |
| 1242280 | 7/1986 | Russian Federation | 72/327 |
| 260124 | 7/1949 | Switzerland | 72/412 |
| 2072059 | 9/1981 | United Kingdom . | |

*Primary Examiner*—Daniel C. Crane

[57] ABSTRACT

A locating feature comprises a plate and a protrusion extending outwardly from the plate. The protrusion includes a substantially linear portion extending from the plate and a dome shaped portion extending from the linear portion.

18 Claims, 3 Drawing Sheets

DOME SHAPED EXTRUDED LOCATION FEATURE TOOL FOR MAKING THE LOCATION FEATURE AND METHOD FOR LOCATING ADJOINING PLATES USING THE LOCATION FEATURE

This is a continuation of application Ser. No. 08/235,997, filed May 2, 1994, now abandoned.

The present invention relates to an apparatus for aligning stamped components. More specifically, the invention relates to an alignment boss for engagement with a mating aperture.

Metal plates are frequently used in frames, covers and panels of manufactured articles and machines. It is important for proper assembling of components for functioning of the machine and for aesthetics that the metal plates be accurately positioned within the machine.

Adjoining adjacent frames, covers and panels may be accomplished visually during assembly. However, visual alignment is very time consuming and does not assure the required positional accuracy that may be required for function or appearance of the articles or machines.

For high production manufactured articles and machines, fixtures and jigs have been designed to aid in assembling articles and machines. These fixtures are expensive and being uniquely designed to assemble certain components have only a limited dedicated use. Further the use of flexible just-in-time manufacturing is not well suited to dedicated fixtures.

In an attempt to overcome these above-mentioned problems, protrusions have been formed in metal plates which mate with holes or slots in an adjoining plate to align the two plates to each other. The holes and slots are typically manufactured by a conventional stamping press (not shown) utilizing standard stamping techniques, the holes and slots being punched from the metal plate by a punch located on a first face of the plate cooperating with a die on the spaced apart opposite face of the plate. The punch shears metal from the plate having the shape of the cross section of the punch. The die includes an aperture usually in the form of a cylindrical hole which has a shape also corresponding to the cross section of the punch. The punch protrudes into the die aperture when the die press in the bottom of its stroke completing the shearing of the metal plate, thus completing the hole or slot.

A typical prior art protrusion that conforms to the above described slot or hole is shown in FIG. 2. The protrusion is formed by utilizing a conventional stamping press similar to the press used to fabricate the slots or holes in the mating metal plate. A sheet metal plate 10 is placed in a stamping press (not shown) with a first plate face 12 located downwardly resting on a sheet metal die 14 (shown in phantom). A distal end 16 of a sheet metal die punch 18 (also shown in phantom) strikes a second plate face 20 spaced from the first face 12. The sheet metal die 14 and punch 18 are a mating set that could be used to form an aperture as described above. Instead of having the punch 18 move sufficiently downward to have the distal end 16 of the punch 18 penetrate into opening 24 of the die 14 and shear a protrusion 26, the distal end 16 of the punch 18 extends past second face 20 a distance D which is less than a distance 30 equal to the the thickness of the plate 10. The extending of the punch 18 past the second face 20 cause the protrusion 26 to be formed extending from the first face 12 of the plate 10. Since the protrusion is formed by a shearing process, the protrusion has a height H which is roughly equal to the distance D. To avoid tearing of the protrusion 26 from the plate 10, the distance D and likewise the height H is limited to forty percent or less of the distance 30.

For proper shearing of the plate 10 to form the protrusion 26 the punch 18 has a periphery 32 smaller than periphery 34 of the opening 24. To permit proper shearing of the material, the differences of the diameters defined by the peripheries 32 and 34 must be uniquely determined for each thickness 30 of the plate 10. A different punch and die set must thus be used to provide the same protrusion size with different plate thicknesses. Added punches and dies are thus required and set up changes are required for punching plates with varied thicknesses.

Metal plates, particularly those with large surface areas, tend to be warped after being stamped. The changes in shape that result from stamping result in non-uniform stresses that manifest themselves in warped faces. To properly align mating parts, the protrusions in a first plate must engage the hole or slot in the mating plate. When the amount of warp of the plates exceed the height H of the flat of the protrusion 26 the protrusion 26 cannot engage the opening 24 in the mating plate, thus preventing the protrusion 26 from performing its function. Unfortunately the height H of a protrusion 26 of a given plate 10 cannot be more than forty percent of the thickness 30. Thicker, and correspondingly heavier and more expensive, plates are required to increase the height H. The following disclosures may be relevant to various aspects of the present invention:

U.S. Pat. No. 5,031,953

Patentee: Miller

Issue Date: Jul. 16, 1991

U.S. Pat. No. 4,915,658

Patentee: Lopata et al.

Issue Date: Apr. 10, 1990

U.S. Pat. No. 4,736,503

Patentee: Stock et al.

Issue Date: Apr. 12, 1988

U.S. Pat. No. 4,534,379

Patentee: Burge

Issue Date: Aug. 13, 1975

U.S. Pat. No. 4,530,033

Patentee: Meggs

Issue Date: Jul. 16, 1985

U.S. Pat. No. 4,342,214

Patentee: Neuendorf

Issue Date: Aug. 3, 1982

U.S. Pat. No. 3,819,246

Patentee: List

Issue Date: Jun. 25, 1974

U.S. Pat. No. 5,031,953 discloses a visor bracket for use in a visor assembly including at least one upwardly extending projection and the outer curved peripheral surface of a central boss which cooperates to prevent misalignment of the boss with a D-shaped opening formed in an inner sheet of the roof of a vehicle during installation of the visor assembly to the vehicle. Preferably the outer curved peripheral surface is defined by the outer curved surface of a plurality of guide ribs which radially project from and extend around the periphery of the boss.

U.S. Pat. No. 4,915,658 discloses a reference and support system for a flat CRT tension shadow mask which includes a support frame which is frit sealed or shrunk fitted onto a peripheral surface surrounding a target area of a flat panel. An upper edge of the support frame is finished so as to provide the desired Q-spacing between the target area and the top of the support frame. Alignment holes are drilled in the sidewalls of the support frame at a given distance from the upper edge to form a reference plane relative thereto.

U.S. Pat. No. 4,736,503 discloses an improved clutch shoe of the type that is mounted on the rotor of a centrifugal clutch for coupling engagement with an outer clutch housing. The shoe is formed by two similar L-shaped shoe half sections which are stamped of sheet metal. Each shoe half section has an arcuate-shaped configuration comprising a web and an integral outer shoe table portion with an annular boss formed on each of the webs. A plurality of annular projections are formed on one of the shoe half webs and extend outwardly therefrom in a direction opposite from the annular boss formed on the web. The other shoe half web is formed with a plurality of holes into which the annular projections are press fitted to connect the two shoe halves together with the webs being placed in abutting relationship.

U.S. Pat. No. 4,534,379 discloses a locking frame for a ball valve consisting of a sheet metal stamping folded into an enclosure having upper and lower plates to partially surround a part of the operating handle and the nut which secures the handle. The handle is keyed to the valve stem and engages body flanges to limit travel to valve open and valve closed positions. The frame is also fitted over the valve stem and includes tabs which engage the flanges to position the same and to prevent rotation thereof.

U.S. Pat. No. 4,520,033 discloses a circuit card frame which includes one-piece molded panels and sidewalls. The panels have U-shaped tenons adapted to be inserted in openings in the sidewalls and slid into place along locating tongues and ridges disposed in the openings. The panels have elastic tongues adapted to be deflected along ramps disposed between pairs of tenons at the ends of the panels where the panels are slid into place, the free edge of the elastic tongues abutting an end of the ramps to lock the panels on the sidewalls.

U.S. Pat. No. 4,342,214 discloses a pilot assembly for locating a workpiece in successive forming stages of a machine, such as a punch press, where the workpiece is progressively moved through toe forming stages of the machine. The pilot assembly includes a pilot pin mounted to a movable die member of the machine for guiding entry into a previously formed hole in a workpiece or in a companion die member as the die members are moved toward each other, the pin being axially retractable in its mounting in the event it strikes an obstruction.

U.S. Pat. No. 3,819,246 discloses a substantially closed multi-sided elongated channel frame locker support member which includes a pair of converging side panels substantially closing the cross-section of the channel frame. Each of the converging side panels of the channel frame is at a preselected angle to its adjacent side panel so that the channel frame can be pre-engineered with one or more arrays of shelf locating and receiving slots in each of the converging side panels and a corresponding number of arrays of door pivot pin receiving holes in each of the side panels adjacent to a converging side panel. The arrays of shelf receiving slots and door pivot pins receiving holes are in a predetermined relationship along the length of the channel support frame.

In accordance with one aspect of the present invention, there is provided a locating feature comprising a plate and a protrusion extending outwardly from the plate. The protrusion includes a substantially linear portion extending from the plate and a dome shaped portion extending from the linear portion.

In accordance with another aspect of the present invention, there is provided an electrophotographic printing machine of the type having a location feature to align adjoining plates of the machine. The location feature comprises a protrusion extending outwardly from one of the plates. The protrusion includes a substantially linear portion extending from the plate and a dome shaped portion extending from the linear portion.

In accordance with a further aspect of the present invention, there is provided a method of locating adjoining plates. The method comprises the step of forming a protrusion in one of the plates with the protrusion including a substantially linear portion extending from the other plate and a domed shaped portion extending from the linear portion. The method also comprises the steps of machining the other of the plates to form an aperture therein and fitting the protrusion into the aperture to locate the plates relative to one another.

In accordance with a further aspect of the present invention, there is provided a tool for forming a locating feature. The tool comprises a die punch having a body and a substantially conofrustical stem extending from the body. The tool also comprises a die bushing defining an aperture therein with the stem of the punch being extendible, at least partially, into the aperture.

The invention will be described in detail herein with reference to the following figures in which like reference numerals denote like elements and wherein.

Figure 1:
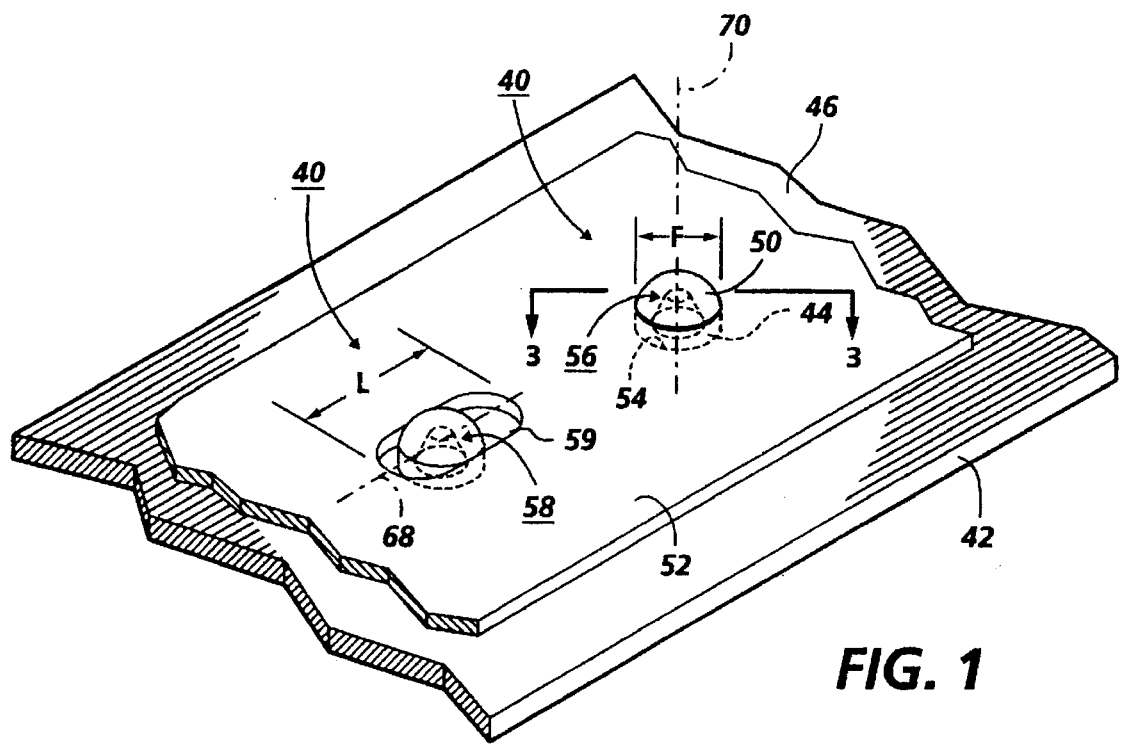
FIG. 1 is a perspective view of the location feature of the present invention in a metal plate engaging apertures in a second metal plate.
Figure 2:
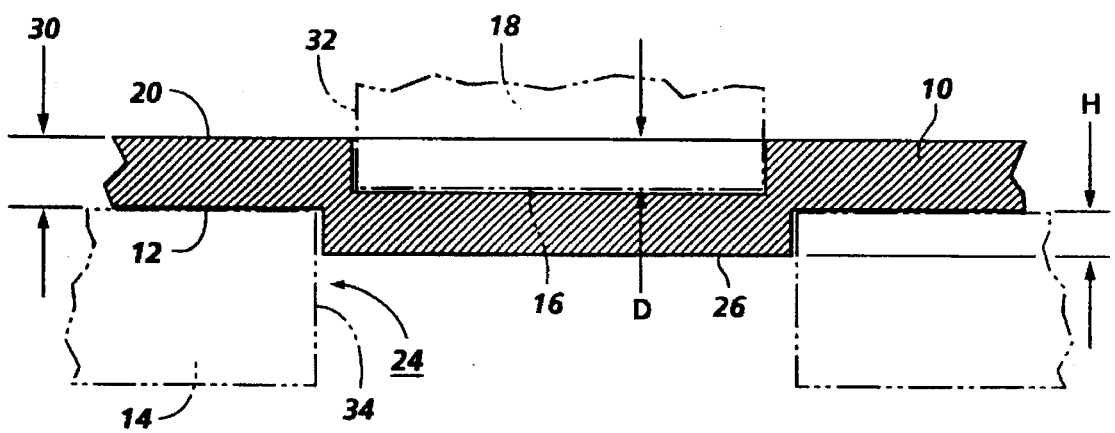
FIG. 2 is a plan view of a prior art location feature.

According to the present invention, and referring to FIG. 1, location features 40 are shown in a first sheet metal plate 42. The location features 40 each include a lower cylindrical protrusion 44 having a diameter F. The cylindrical protrusion 44 extends upwardly from an upper face 46 of the first sheet metal plate 42. A hemispherical protrusion 50 extends upwardly from the cylindrical protrusion 44. Each of the location features 40 serves to locate and register a second sheet metal plate 52 relative to the first sheet metal plate 42. The first sheet metal plate 52 rests upon the upper face 46 of the first sheet metal plate 42 and includes a first aperture 54 in the form of a hole which matingly engages the location feature 40. It should be appreciated that the location feature 40 may be a solitary location feature located on sheet metal plate 42 or as shown in FIG. 1, include both a first location feature 56 and a second location feature 58 spaced from the first location feature 40. Both location features 40 extend outwardly from the upper face 46 of the first sheet metal plate 42. When a pair of location features 40 are utilized, the second sheet metal plate 52 includes a second aperture 59 in the form of a elongated slot formed in the second sheet metal plate 52. The second location feature 58 is matingly fit into the slot 59 of the second sheet metal plate 52. Preferably, the slot 59 extends in the direction of the first location feature 56 permitting error in the distance between the hole 54 and the slot 59 and to prevent relative rotation between the first sheet metal plate 42 and the second sheet metal plate 52. The sheet metal plates 42 and 52 may have any thickness and be made of any material that is normally formed by stamping including, but not limited to, low carbon soft and semi-hard steel materials with a Rockwell "B" Scale hardness of 75 or less.

Figure 5:
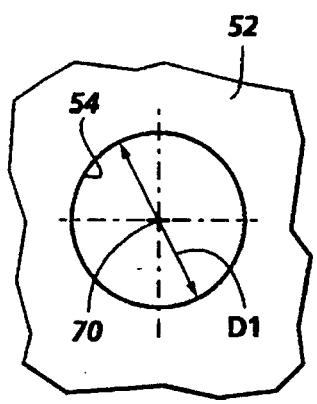
FIG. 5 is a plan view of a suitable hole in a mating part for cooperation with the location feature of the present invention.

The first aperture 54 is shown in more detail in FIG. 5. The aperture 54 may take on any suitable configuration but preferably is in the form of a cylindrical opening or hole which is normal or perpendicular to the second sheet metal plate 52. The hole 54 defines a hole diameter D1 which provides a clearance fit with the diameter F of cylindrical protrusion 44. The diameter F of the cylindrical protrusion 44 may alternately be interferencingly fitted to diameter D1 of the hole 54.

Figure 6:
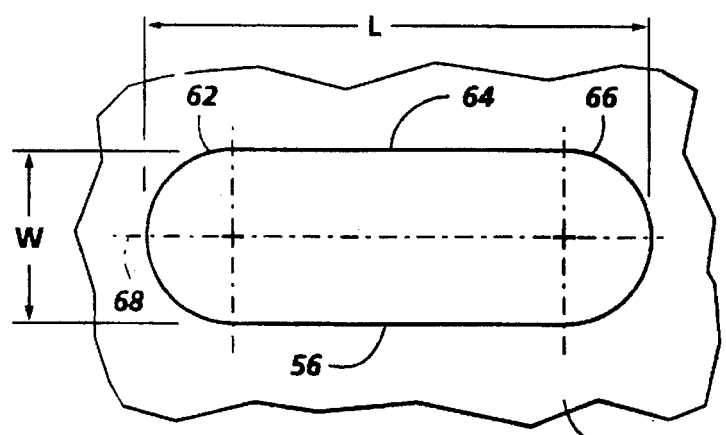
FIG. 6 is a plan view of a suitable slot in a mating part for cooperation with the location feature of the present invention.

The elongated slot 59 is shown in greater detail in FIG. 6. The elongated slot 59 may have any suitable configuration but preferably, includes a first semi-cylindrical section 62. A rectangular section 64 adjoins the open end of the first semi-cylindrical section 62. A second semi-cylindrical section 66 adjoins the rectangular section 64 opposite the first semi-cylindrical section 62, thereby forming the oval elongated slot 59. The slot 59 is preferably normal or perpendicular to the second sheet metal plate 52. Axis 68 extends lengthwise through the slot 59 and preferably intersects centerline 70 of the hole 54 (see FIG. 5). The slot 59 has a lengthwise dimension L and a width W.

Figure 3:
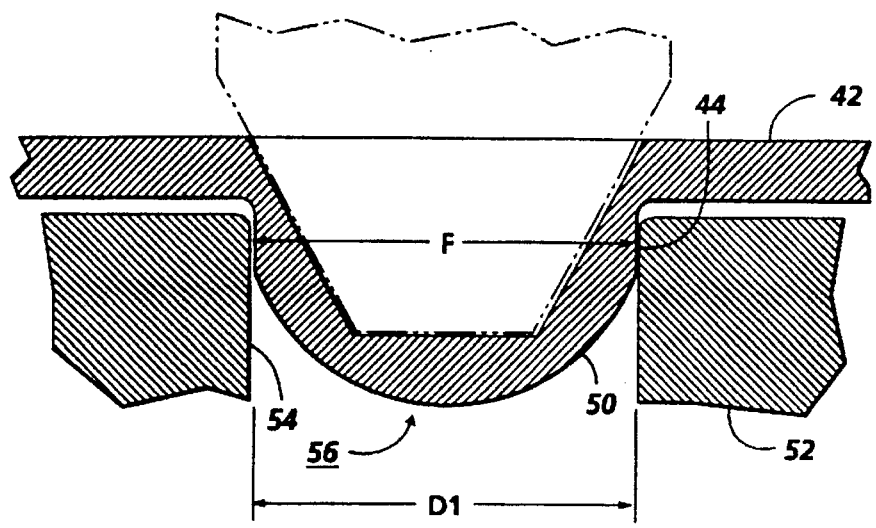
FIG. 3 is a partial sectional view through the line 3—3 of FIG. 1.

Now referring to FIG. 3, the first sheet metal plate 42 is shown in engagement with the second sheet metal plate 52. During engagement, the hemispherical protrusion 50 first extends into hole 54 of the second sheet metal plate 52. The hemispherical shape of the first location feature 56 serves to guide the first location feature 56 into the hole 54. After the hemispherical protrusion 50 of the first location feature 56 enters the hole, the cylindrical protrusion 44 engages the hole 54. The diameter F of the cylindrical protrusion 44 matingly slides into the diameter D1 of the hole 54 thereby aligning the first sheet metal plate 42 to the second sheet metal plate 52.

Figure 4:
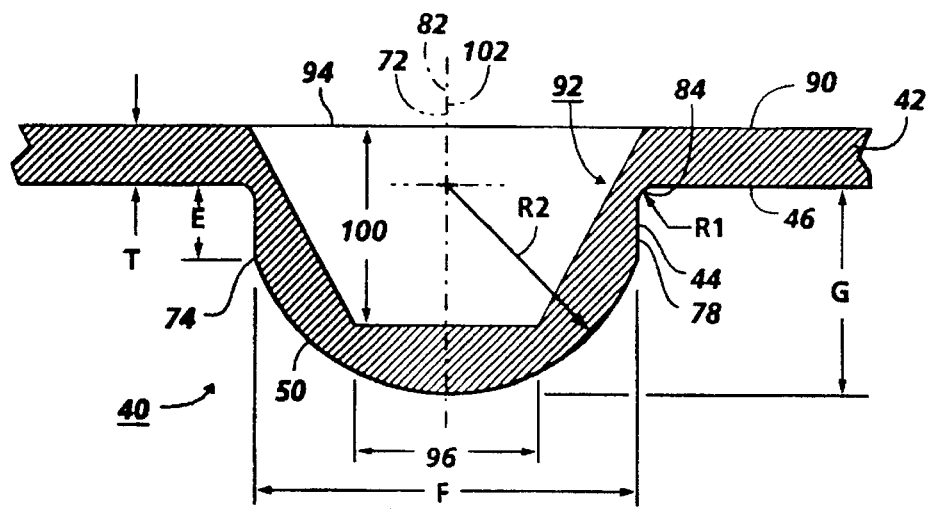
FIG. 4 is a sectional plan view of the location feature of the present invention.

Referring now to FIG. 4, the location feature 40 is shown in greater detail. The location feature 40 extends upwardly from the first surface or upper face 46 of the first sheet metal plate 42. The location feature 40 includes the cylindrical protrusion 44 which extends from the upper face 46. The cylindrical protrusion 44 defines a cylindrical protrusion axis 72 which is preferably normal or perpendicular to the upper face 46. The cylindrical protrusion 44 extends upwardly from the upper face 46 to a distal end 74 of the cylindrical protrusion 44 for a distance defined by length of straight E of the cylindrical protrusion 44. An outer periphery 78 of the cylindrical protrusion 44 is defined by the diameter F of the cylindrical protrusion 44. The hemispherical protrusion 50 extends upwardly from the distal end 74 of the cylindrical protrusion 44 and is defined by a hemispherical protrusion radius R2 which is significantly larger than half of the diameter F of the cylindrical protrusion 44. The hemispherical protrusion 50 is defined by a hemispherical protrusion axis 82 which is normal to the first surface 46 and preferably colinear with the cylindrical protrusion axis 72. The distance between the upper face 46 of plate 42 and the top of the hemispherical protrusion 50 is defined as an overall height G of the location feature 40.

A fillet radius 84 is formed between the outer periphery 78 of the cylindrical protrusion 44 and the upper face 46 of the plate 42. The fillet radius 84 is defined by a radius dimension R1 which blends the outer periphery 78 to the first surface 46. Large dimensions of R1 increase the strength of the protrusion and prevents stress risers to occur at the fillet radius 84, while two large of a dimension R1 results in an interference with the proper engagement of the second sheet metal plate 52 (see FIG. 1). It is recommended that the dimension R1 be less than 0.12 mm.

Referring again to FIG. 4, the first sheet metal plate 42 includes a second surface 90 which is spaced from and generally parallel to the first surface 46 of the plate 42. A conofrustical indentation 92 extends inwardly from the second surface 90. The conofrustical indentation 92 has an outer diameter 94 at the second surface 90 and a inner diameter 96 located inwardly from the second surface 90 a distance or depth 100 from the second surface 90. Preferably, the conofrustical indentation 92 defines a conofrustical indentation axis 102 which is preferably normal or perpendicular to the second surface 90. Preferably, the conofrustical indentation axis 102 is colinear with both the cylindrical protrusion axis 72 and the hemispherical protrusion axis 82. A moderate amount of non-colinearity among the conofrustical indentation axis 102, the cylindrical protrusion axis 72 and the hemispherical protrusion axis 82 may be acceptable, but an excessive amount of non-colinearity will effect the strength and integrity of the location feature 40 and deter the ability to form the location feature 40.

The distance between first surface or upper face 46 and second surface 90 of the first sheet metal plate 42 defines a thickness T between the surfaces. The height E of the cylindrical protrusion 44 which is defined by the distance between the distal end 74 of the cylindrical protrusion and a proximate end 84 of the cylindrical protrusion 44 effects the ability of the location feature 40 to properly mate with an aperture in a warped mated sheet metal plate. The height E of the cylindrical protrusion may extend more than 1.2 times the thickness T of the plate 42.

Figure 7:
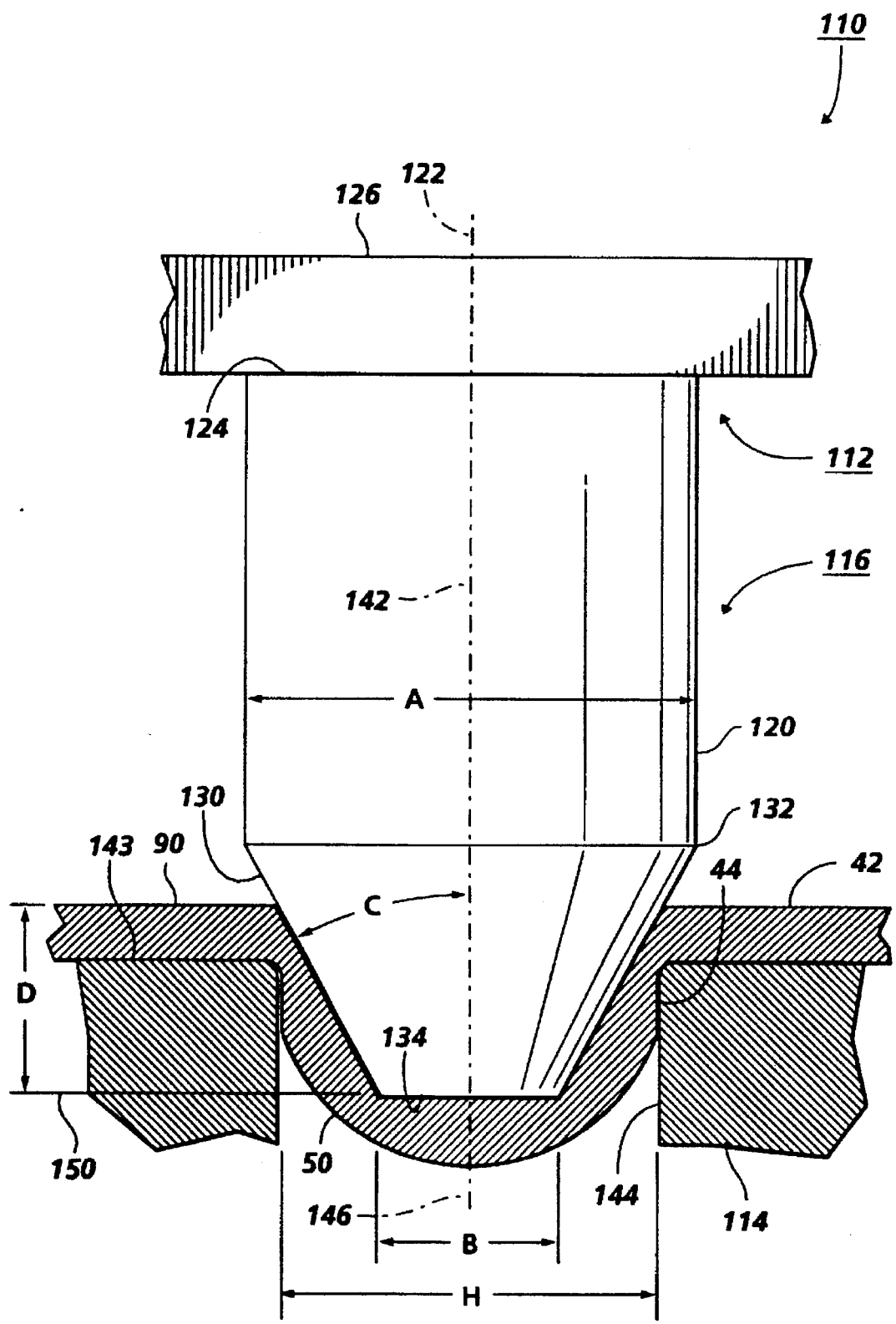
FIG. 7 is a plan view of a die punch and mating die bushing for the manufacture of the location feature of the present invention.

Referring now to FIG. 7, a tool 110 for the forming of a location feature is shown. The tool 110 includes a punch assembly 112 which preferably is attached to a standard commercial die press (not shown) and a die bushing 114 preferably also attached to a standard commercial die press (not shown). For sheet steel with up to and including a hardness of Rockwell "B" of 60–75 and a thickness of up to 2.5 mm., location features of up to 6.00 mm. in diameter F (see FIG. 3) can be manufactured on a 60 ton press. Typically, a die press operates with the punch assembly 112 reciprocating in a vertical direction with the punch assembly 112 located above the die bushing 114. The invention, however, is not intended to be limited to the particular orientation of the relative position of the punch assembly 112 and the die bushing 114. The sheet metal plate 42 is positioned between the punch assembly 112 and the die bushing 114. The punch assembly 112 includes a punch 116 which has a punch body 120 having any suitable shape. Preferably, the punch body 120 has a cylindrical shape with a body diameter or punch diameter A and the punch body 120 defines a punch body axis 122 preferably oriented in the vertical direction. A proximate end 124 of the body 120 is attached to a punch plate 126 of the punch assembly 112. A conofrustical stem 130 extends inwardly and downwardly from a distal end 132 of the punch body 120 at a punch angle C from the body axis 122. A distal end 134 of the conofrustical stem 130 has a tip width B and contacts the second surface 90 of the first sheet metal plate 42. The conofrustical stem 130 defines a conofrustical stem axis 142 which preferably is colinear with the punch body axis 122 and is located generally perpendicular to the second surface 90 of the first sheet metal plate 42. The distal end 134 of the stem 130 extends beyond an upper face 143 of the die bushing 114. The punch 116 and the die bushing 114 required for this process may be made from any suitable or durable material such as a tool steel. For example, the punch 116 may be fabricated from commercially available punch blanks made of A2 tool steel with a Rockwell Scale "C" hardness of 60–63 and the die bushing 112 may be commercially available die bushings made of A2 tool steel with a Rockwell Scale "C" hardness of 60. Carbide materials may serve equally as well but are not required for the operation of this invention.

The die bushing 114 includes an aperture 144 which is preferably in the form of a cylindrical hole having a diameter H. The aperture 144 defines an aperture axis 146 which is preferably colinear to the punch body axis 122. As the distal end 134 of the stem 130 extends past the second surface 90 of the metal plate 42, the metal in the first sheet metal plate 42 is extruded downwardly into the aperture 144 with the metal of the sheet metal plate 42 conforming to the aperture 144. When the punch 116 reaches a lowermost position 150, the first sheet metal plate 42 includes a fully developed location feature 40 including the cylindrical protrusion 44 and the hemispherical protrusion 50 extending downwardly from the cylindrical protrusion 44. At the lowermost position 150 the distal end 134 of the stem 130 extends past the upper face 143 of the bushing 114 defining a punch penetration D therebetween.

Examples of sheet metal plates that are suitable for the manufacturing the location feature of the present invention are shown in Table 1.

TABLE 1

| Material Gage | Material Thickness (mm) | Gage Nominal (inch) | Minimum Thickness |
|---|---|---|---|
| 20 | 1.0 | 0.0359 | 0.0329 |
| 18 | 1.2 | 0.0478 | 0.0438 |
| 16 | 1.5 | 0.0598 | 0.0548 |
| 14 | 2.0 | 0.0747 | 0.0697 |

Recommended tolerances for the location feature of the present invention are shown in Table 2. The recommended material thickness/ bushing diameter combinations are shown in bold face type.

TABLE 2

RECOMMENDED TOLERANCES FOR 'BULLET' PERF

| Material Thickness, T (mm) | Diameter of Bushing, H (mm) | Boss Radius, R2 (mm) | Boss Diameter F (mm) | Length of Straight, E (mm) | Boss Height, G (mm) |
|---|---|---|---|---|---|
| 1.0 | 3.0 | 3.0 mm (max) | 3 + 0, −0.1 mm | 0.6 mm (min) | 2.05 mm (max) |
| 1.2 | 3.0 | 3.0 mm (max) | 3 + 0, −0.1 mm | 0.7 mm (min) | 2.10 mm (max) |
| 1.0 | 4.0 | 4.0 mm (max) | 4 + 0, −0.1 mm | 0.6 mm (min) | 2.50 mm (max) |
| 1.2 | 4.0 | 4.0 mm (max) | 4 + 0, −0.1 mm | 0.7 mm (min) | 2.50 mm (max) |
| 1.5 | 4.0 | 4.0 mm (max) | 4 + 0, −0.1 mm | 0.7 mm (min) | 2.75 mm (max) |
| 2.0 | 4.0 | 4.0 mm (max) | 4 + 0, −0.1 mm | 1.0 mm (min) | 3.00 mm (max) |
| 1.2 | 5.0 | 4.0 mm (max) | 5 + 0, −0.1 mm | 0.7 mm (min) | 2.95 mm (max) |
| 1.5 | 5.0 | 4.0 mm (max) | 5 + 0, −0.1 mm | 0.7 mm (min) | 3.00 mm (max) |
| 2.0 | 5.0 | 4.0 mm (max) | 5 + 0, −0.1 mm | 1.0 mm (min) | 3.45 mm (max) |
| 1.5 | 6.0 | 6.0 mm (max) | 6 + 0, −0.1 mm | 0.7 mm (min) | 3.60 mm (max) |
| 2.0 | 6.0 | 6.0 mm (max) | 6 + 0, −0.1 mm | 1.0 mm (min) | 3.90 mm (max) |

Table 3 shows the recommended tolerances for mating holes and slots to be used with the location feature of the present invention.

TABLE 3

MANUFACTURING AND TOOLING DATA FOR BULLET BOSS RECOMMENDED TOLERANCES FOR MATING HOLE/SLOT

| Diameter of Bushing, H (mm) | Diameter of Boss, F (mm) | Mating Hole Diameter, D1 (mm) | Mating Slot Dimensions, WXL, (mm) | |
|---|---|---|---|---|
| | | | W + 0.25 −0 | L + 0.5 −0 |
| 3.0 | 3 + 0, −0.1 mm | 3.1 + 0.1 −0 | 3.1 | 8 |
| 4.0 | 4 + 0, −0.1 mm | 4.1 + 0.1 −0 | 4.1 | 10 |
| 5.0 | 5 + 0, −0.1 mm | 5.1 + 0.1 −0 | 5.1 | 13 |
| 6.0 | 6 + 0, −0.1 mm | 6.1 + 0.1 −0 | 6.1 | 13 |

Table 4 provides information regarding the punch and die bushing recommended dimensions for the location feature.

TABLE 4

PUNCH/BUSHING DIMENSIONS FOR BULLET BOSS

| Diameter of Bushing, H (mm) | Punch Diameter, A (mm) | Punch Angle, C (degrees) | Tip Width, B (mm) |
|---|---|---|---|
| 3.0 | 3.5 | 30 | 1.5 |
| 4.0 | 4.5 | 30 | 2.0 |
| 5.0 | 5.5 | 30 | 2.5 |
| 6.0 | 6.5 | 30 | 3.0 |

As shown in Table 4, the body of the punch has a diameter of 3.5 mm for a bushing with a diameter of 3 mm and has a diameter of 6.5 mm for a bushing with e diameter of 6 mm.

The ratio of body diameter of the punch to the aperture diameter of the die bushing ranges in this table from 6.5/6.0 to 3.5/3.0 or 108% to 117%. The body diameter of the punch is thus 8% to 17% larger than the aperture diameter of tho die bushing.

Further, as shown in Table 4, the tip diameter is 1.5 mm for a punch with a body diameter of 3.5 mm and 3.0 mm for a punch with a body diameter of 6.5 mm. The ratio of tip diameter to the body diameter is 1.5/3.5 to 3.0/6.5 or 42% to 46%.

Table 5 provides information regarding the desired punch penetration.

TABLE 5

PUNCH PENETRATIONS TO ACHIEVE DESIGN GUIDE-
LINES FOR LENGTH OF STRAIGHT PORTION

| Material Thickness, T (mm) | Bushing Diameter, H (mm) | Actual Punch Penetration, D (inch) |
|---|---|---|
| 1.0 | 3 | 0.041 |
| 1.2 | 3 | 0.033 |
| 1.0 | 4 | 0.056 |
| 1.2 | 4 | 0.053 |
| 1.5 | 4 | 0.046 |
| 2.0 | 4 | 0.045 |
| 1.2 | 5 | 0.068 |
| 1.5 | 5 | 0.067 |
| 2.0 | 5 | 0.060 |
| 1.5 | 6 | 0.067 |
| 2.0 | 6 | 0.080 |

The greater length of the cylindrical portion of the location feature of the present invention greatly improves the engagement of the location feature into any sheet metal part and is particularly more effective than prior art features in warped parts. While the protrusions of the prior art which are formed by shearing have a depth limited to about 40% of the thickness of the sheet metal plate, the extruded protrusions of the location feature of the present invention may extend up to 125% of the thickness of the sheet metal plate greatly improving the ability to engage warped mating parts.

The hemispherical protrusion extending from the cylindrical protrusion provides for a bullet-like guiding or leading in feature to greatly assist in the alignment of mating sheet metal parts. Assembly times of sheet metal components and equipment can be greatly reduced and the fixturing and tooling required to assemble these pieces may be greatly simplified.

As earlier described, when prior art location features were fabricated, the die punch required to form the location feature had to be changed for each different thickness of the sheet metal plate. With the use of the present invention, a common die punch may be used for a variety of thicknesses of sheet metal plates. The depth to which the punch 116 is engaged into the sheet metal plate is merely varied depending upon the material thickness. The tooling required to manufacture a variety of location features is thereby simplified and the changeover from the manufacturer of one thickness of sheet metal plate to a different thickness is greatly reduced.

The location feature of the present invention is formed by an extruding process rather than by the shearing process required for the prior art location feature. Extruding increases the strength of the location feature of the present invention. The ability of the present invention location feature to support large transverse loads is particularly superior. The location feature of the present invention may thus eliminate the need for additional fasteners which would otherwise be required to withstand the transverse loads experienced between adjoining metal plates. The cost for manufacturing components requiring metal plates can thus be reduced.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A locating feature for engagement with a member, comprising:

a plate including opposed parallel surfaces; and a protrusion extending outwardly from said plate, said protrusion including a substantially linear portion extending normally from said plate, and a dome shaped portion extending from said linear portion, said exterior of said protrusion extending from one of the opposed surfaces, said protrusion having an interior defined by only a conofrustical pocket therein opposed to the dome shaped portion of said protrusion and extending immediately from the other of the opposed parallel surfaces.

2. The locating feature of claim 1 in which said linear portion extends a distance at least as great as the distance between opposed surfaces of said plate.

3. The locating feature of claim 1 in which said plate includes opposed surfaces with said protrusion extending from one of the opposed surfaces, wherein said linear portion extends a distance substantially twice the distance between opposed surfaces of said plate.

4. The locating feature of claim 1 wherein the conofrustical pocket defines an included angle of approximately 60 degrees.

5. The locating feature of claim 1 wherein the linear portion extends a distance approximately at least one-half the distance between opposed surfaces of said plate.

6. The locating feature of claim 5 wherein said protrusion comprises sheet steel.

7. The locating feature of claim 1 wherein said protrusion comprises sheet steel.

8. The locating feature of claim 7 wherein:

said protrusion has a Rockwell "B" hardness of at least 60; and said plate has a thickness of at least approximately 1 mm.

9. The locating feature of claim 2 wherein said protrusion comprises sheet steel.

10. The locating feature of claim 3 wherein said protrusion comprises sheet steel.

11. A method of locating adjoining plates, comprising the steps of:

forming a protrusion in the first of the plates with the protrusion having an exterior Including a substantially linear portion having a length at least one half of the thickness of the first plate and extending normally from the first plate and a domed shaped portion extending from the linear portion, the protrusion having an interior defined by only a conofrustical pocket therein opposed to the dome shaped portion of the protrusion end extending immediately from a surface of the first plate;

machining the other of the plates to form an aperture therein; and fitting the protrusion into the aperture to locate the plates relative to one another, so that the linear portion of the protrusion extends sufficiently into the second plate to adjoin the plates when adjoining surfaces of at least one of the plates are not flat.

12. The method of claim 11 wherein the forming step comprises forming the protrusion in the first of the plates with the linear portion having a length at least as great as the thickness of the first plate.

13. The method of claim 12 wherein the forming step comprises forming the protrusion in the first of the plates with the linear portion having a length substantially twice the thickness of the first plate.

14. A tool for forming a locating feature on a plate, comprising;
 a pinch having a body defining a cylindrical body diameter thereof and a substantially conofrustical stem extending directly from the body, the stem defining a first end of said punch and the stem defining a tip diameter thereof the stem defining an included angle; thereof and
 a die bushing having a surface for supporting a plate and defining and aperture therein with the stem of the punch being extendible, at least partially, into the aperture, the aperture defining an aperture diameter thereof, so that said punch and said die bushing may be used for forming a protrusion in said plate having opposed surfaces, the protrusion extending outwardly from the plate the protrusion having an exterior including a substantially linear portion extending normally from the plate, and a dome shaped portion extending from the linear portion, the protrusion having an interior defined by only a conofrustical pocket therein opposed to the dome shaped portion of the protrusion and extending immediately from a surface of the first plate, when said punch and said die bushing contact opposed surfaces of the plate.

15. The tool of claim 14, further comprising means responsive to said punch and said die bushing for forming the protrusion.

16. The tool of claim 14, wherein the body diameter of said punch is approximately 8 to 17 percent larger than the aperture diameter of said die bushing.

17. The tool of claim 14, wherein the tip diameter is approximately 42 to 46 percent of the body diameter.

18. The tool of claim 14, wherein the stem defines an included angle of approximately 60 degrees.

\* \* \* \* \*